No. 742,034. PATENTED OCT. 20, 1903.
S. W. JOHNSON.
MOWER.
APPLICATION FILED OCT. 23, 1901.
NO MODEL. 5 SHEETS—SHEET 1.

Witnesses
Inventor
Sam'el W. Johnson,
By Victor J. Evans
Attorney

No. 742,034. PATENTED OCT. 20, 1903.
S. W. JOHNSON.
MOWER.
APPLICATION FILED OCT. 23, 1901.
NO MODEL. 5 SHEETS—SHEET 3.

Witnesses

Inventor
Samuel W. Johnson
By Victor J. Evans,
Attorney

No. 742,034. PATENTED OCT. 20, 1903.
S. W. JOHNSON.
MOWER.
APPLICATION FILED OCT. 23, 1901.
NO MODEL. 5 SHEETS—SHEET 4.
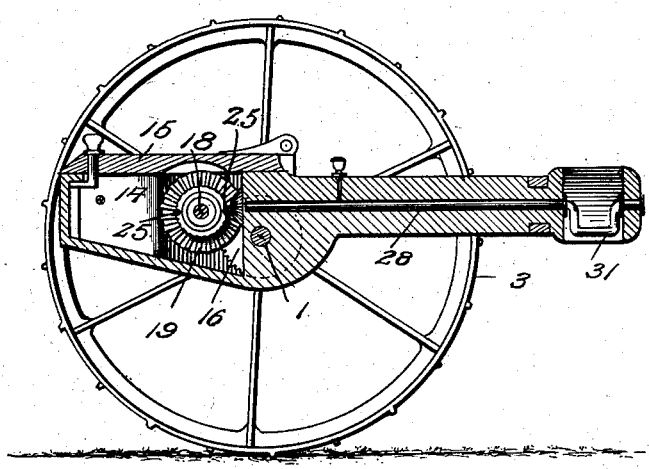
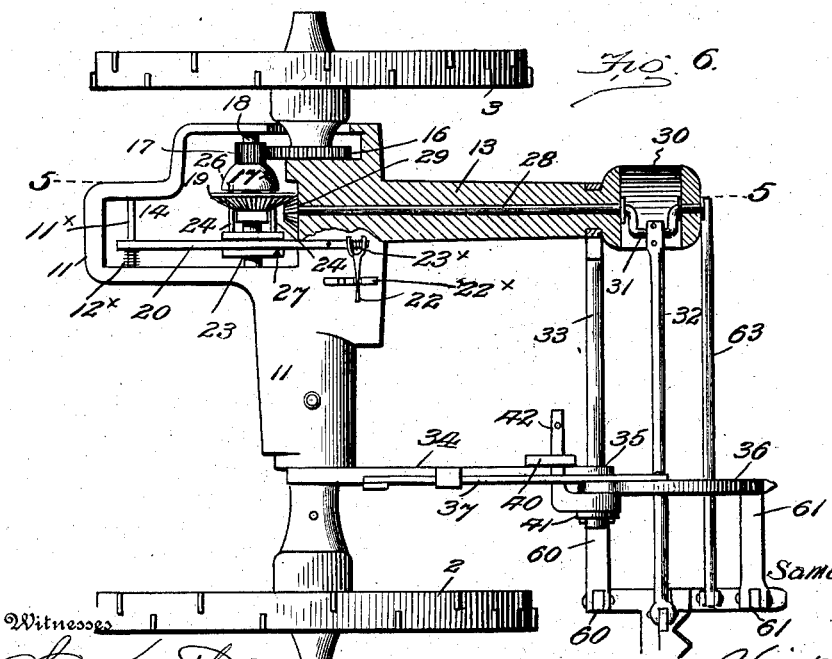

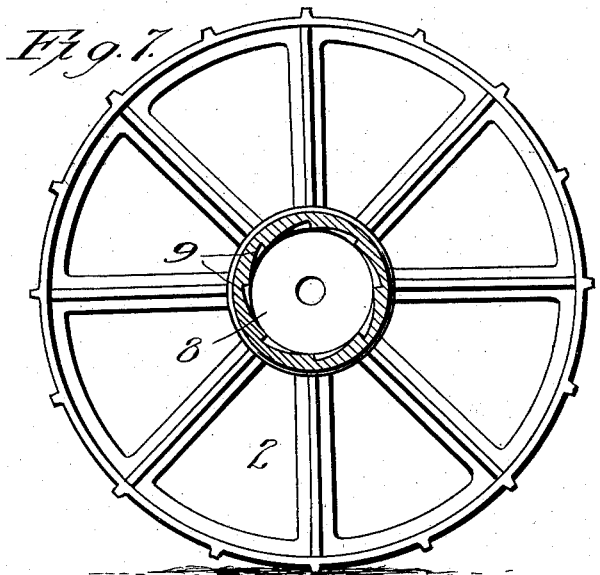
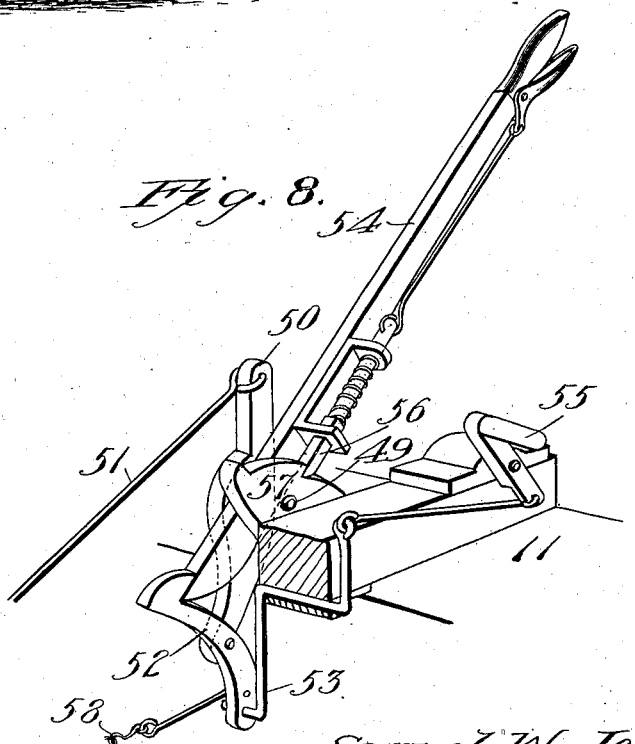

No. 742,034. Patented October 20, 1903.

UNITED STATES PATENT OFFICE.

SAMEIL W. JOHNSON, OF CARBON, WYOMING.

MOWER.

SPECIFICATION forming part of Letters Patent No. 742,034, dated October 20, 1903.

Application filed October 23, 1901. Serial No. 79,739. (No model.)

*To all whom it may concern:*

Be it known that I, SAMEIL W. JOHNSON, a citizen of the United States, residing at Carbon, in the county of Carbon and State of Wyoming, have invented new and useful Improvements in Mowers, of which the following is a specification.

This invention relates to mowers, and has for its object to provide a durable and efficient device of the character described which will meet the demands of the trade in a more perfect manner than is possible by the use of the machines now generally in use.

Other objects as well as the novel details of construction will be more fully described hereinafter, and the novel details of construction will be clearly illustrated in the accompanying drawings, in which—

Figure 1:
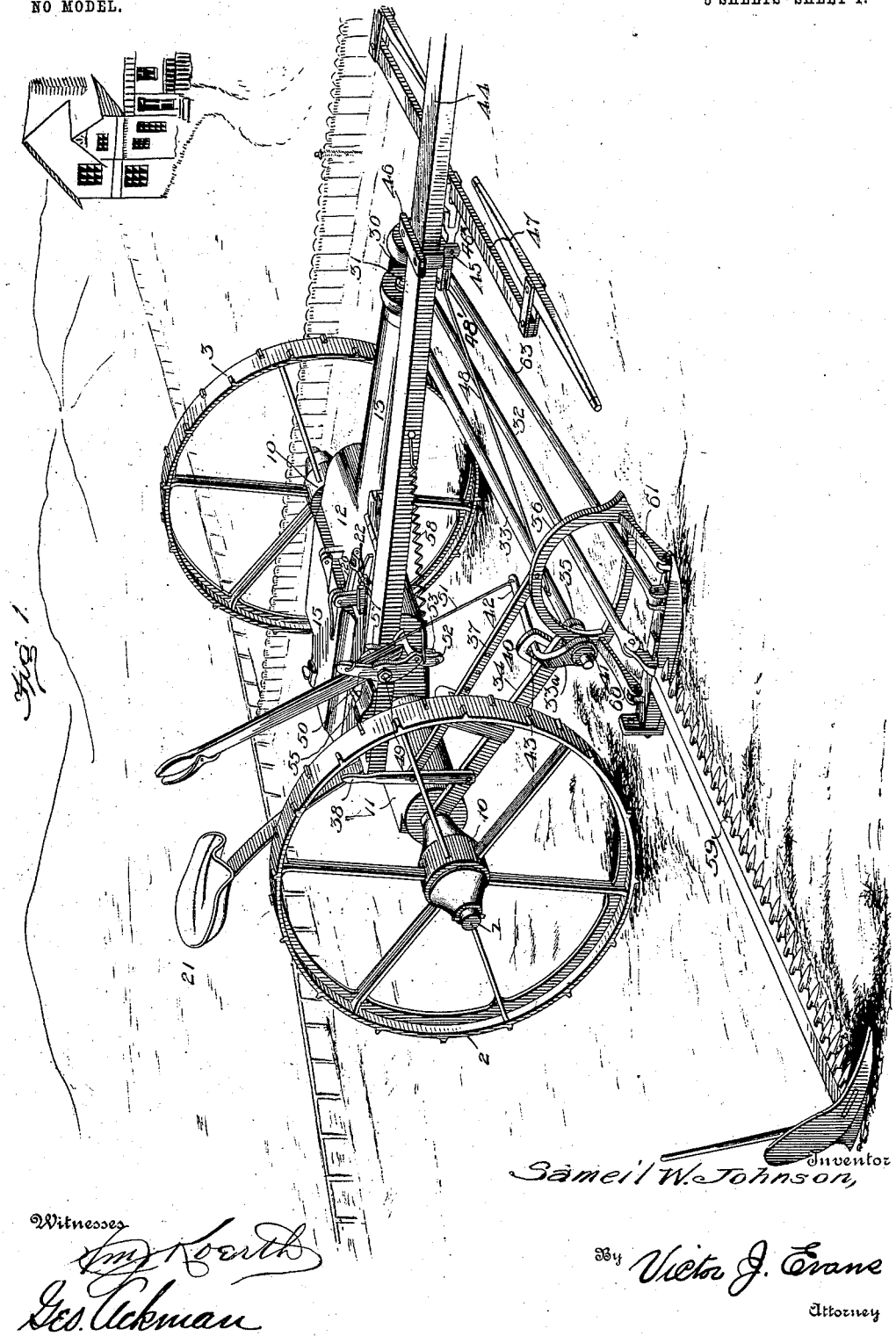
Figure 2:
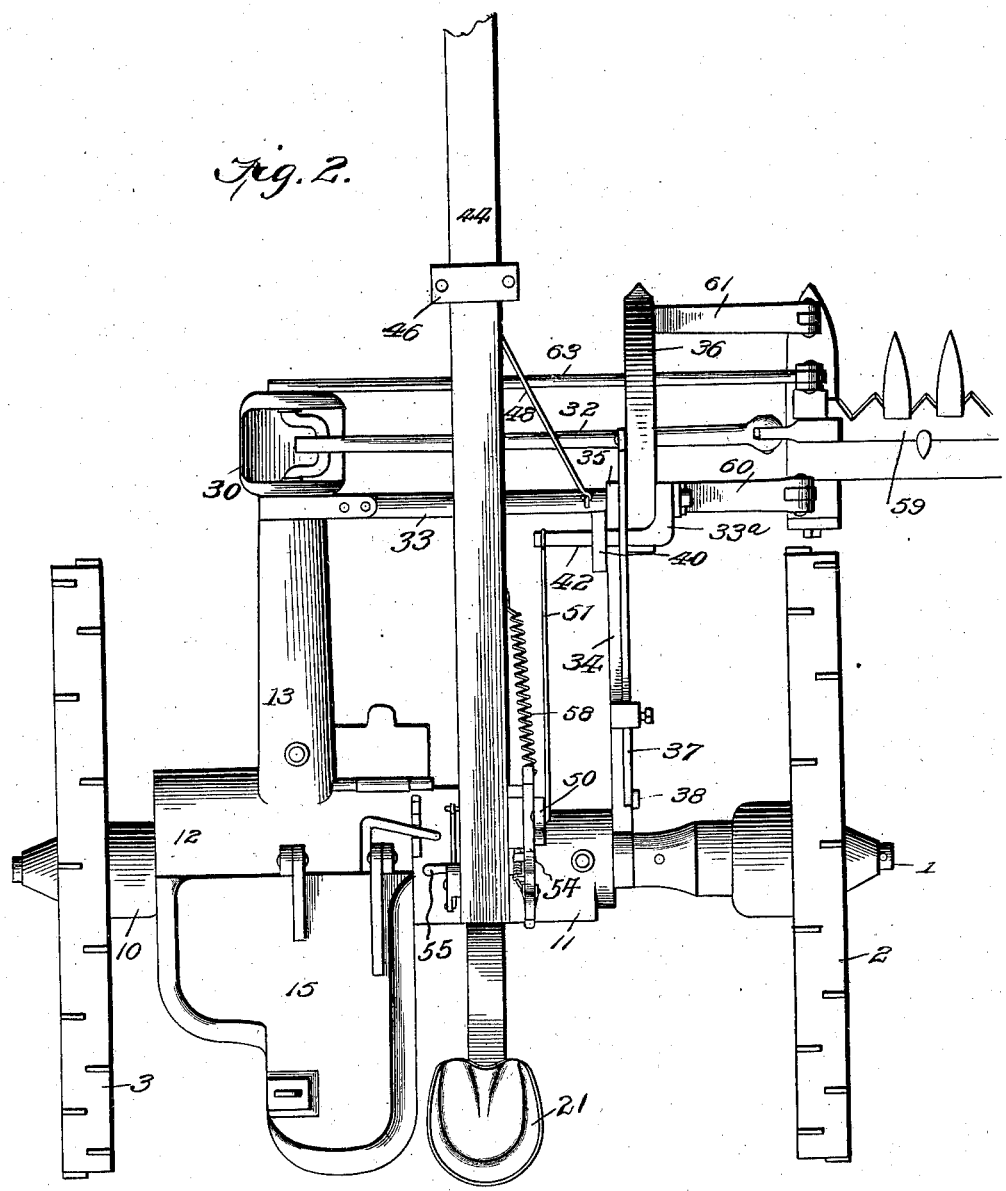
Figure 3:
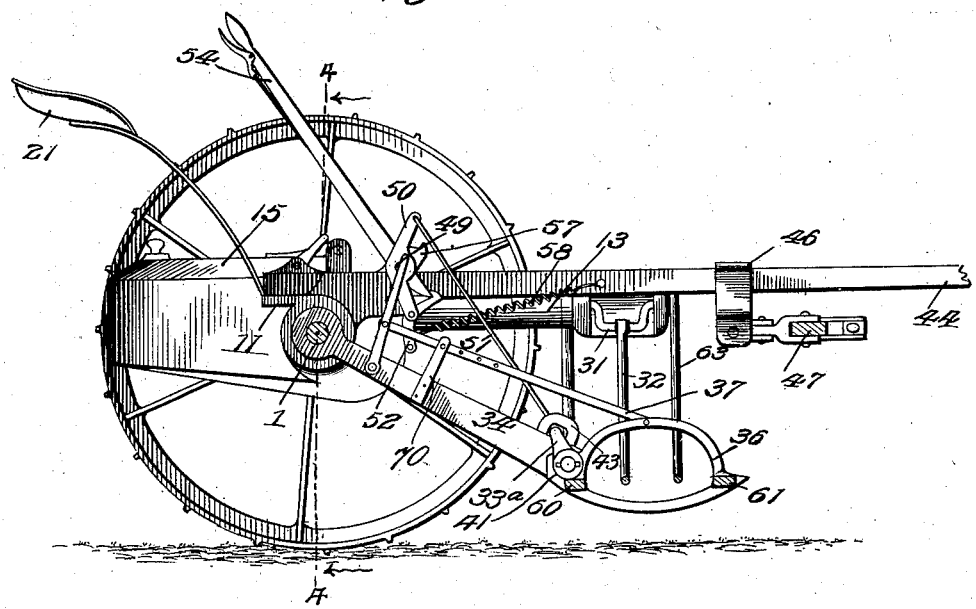
Figure 4:
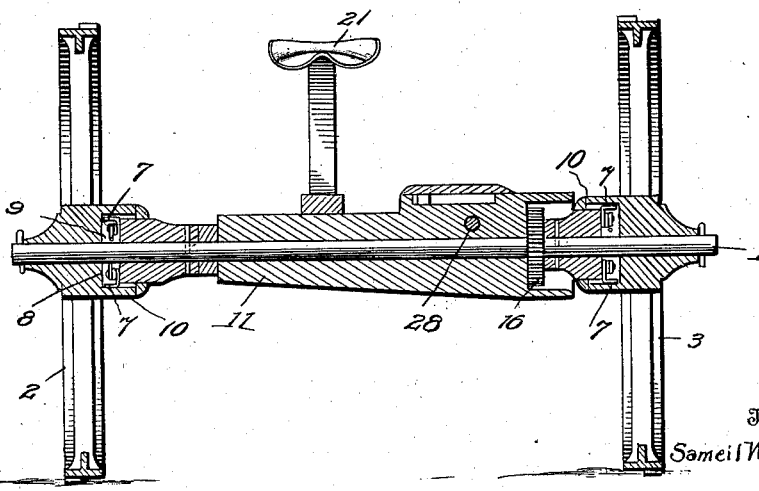

Figure 1 is a perspective view of a mower constructed in accordance with my invention. Fig. 2 is a top plan view of the same, the cutter-bar being broken away. Fig. 3 is a vertical longitudinal sectional view of the mower. Fig. 4 is a transverse section on the line 4 4 of Fig. 3. Fig. 5 is a longitudinal section on the line 5 5 of Fig. 6. Fig. 6 is a top plan view of the machine, the operating mechanism being shown in section. Fig. 7 is a detail view illustrating the construction of the ratchet mechanism employed in connection with the traction-wheels. Fig. 8 is a detail perspective, partly in section, showing the arrangement of the operating-levers and the means for connecting the hand and foot levers.

The reference-numeral 1 designates an axle on the respective ends of which are traction-wheels 2 and 3. Each wheel is provided with a sectional hub, one portion of which is formed rigid with the axle and is provided with the usual pivoted dogs or pawls 7. The remaining portions of the hubs are rigid with the wheels 2 and 3 and are revolubly mounted on the axle 1. The inner side of each latter-mentioned hub portion is formed with an enlarged concentric recess 8, provided around their inner edges with notches or teeth 9, as shown in Fig. 7, which are adapted to engage with the dogs or pawls 7, as shown in Fig. 4, in such a manner that when the machine moves forward the axle will be caused to rotate with the wheels. When, however, the machine is moved in the opposite direction, the wheels will rotate idly upon the said axle. Laterally-extending and peripherally-arranged flanges 10 project from the hub portions carried by the wheel and overlap the ends of the hub portions carried by the axle, so as to exclude dust, dirt, and other foreign substances from coming into contact with the pawls or dogs.

A casting (designated by the reference-numeral 11) is loosely mounted upon the axle 1, intermediate the ends thereof, and is designed to carry the gear for driving the cutting apparatus. This casting is substantially L-shaped, and at or adjacent the juncture of the two arms 12 and 13 is provided a chamber 14, in which the driving mechanism is arranged and protected by a hinged cover or lid 15. A particular advantage in constructing this casting in one piece is to add strength and rigidity to the same, and thereby reduce the liability of the parts becoming disarranged or broken. The importance of this construction will more clearly present itself as the arrangement of the parts comprising the whole is more clearly understood.

Rigidly keyed to the shaft 1 is a gear-wheel 16, which meshes with a pinion 17 on a shaft 18, laterally disposed within the chamber 14 and having bearing in the walls of said chamber and on which is loosely mounted a beveled gear 19, adjacent the pinion. This pinion 17 is provided at its inner side with an enlarged portion $17^\times$, having transverse apertures extending therethrough, the functions of which will be set forth hereinafter.

20 designates a clutch-lever which is pivotally mounted upon the casting 11 and has its inner portion extended to a point within the chamber 14 and arranged to slide upon a guide-rod $11^\times$, mounted within the chamber and extending transversely thereof. Upon the rod $11^\times$ is arranged an expansive spiral spring $12^\times$, the ends of which abut the wall of the chamber and the rear end of the lever 20 and the expansive force of which tends to normally hold the clutch carried by the lever 20 in operative engagement with the gearing. Upon the outer end of the lever 20 is pivotally mounted a vertically-swinging operating-lever 22, by means of which the clutch-lever 20 may be actuated to throw the clutch into or out of engagement. Upon the lever 20 is arranged a spring 23×, the tendency of which is to hold the lever 22 normally depressed and in engagement with the segmental rack 22×, whereby the clutch-bar is held against accidental displacement. Slidingly disposed upon the shaft 18 and carried by the lever 20 is a clutch-disk 23, arranged to be moved toward and away from the gear 19 by the said lever. This disk, as shown in Figs. 5 and 6, carries a plurality of laterally-projecting pins 24, which are arranged to be projected through openings 25 in the gear 19 and into recesses 26 in the enlarged portion 17× of the pinion 17, so that the gear 16, the pinion 17, and the bevel-gear 19 will be thrown into mesh. Inasmuch as the disk 23 is provided with a peripheral groove 27, which is engaged by the bar 20, the gearing thus far described may operate independently of the bar, said bar being used only to operate the clutch.

A shaft 28 runs through the entire length of the arm 13 of the casting 11, and on the end within the chamber 14 is a bevel-gear 29, arranged to mesh with the gear 19, whereby motion is imparted to said shaft. It will be noticed that on the free end of said arm 13 of the casting 11 is a cut-out portion 30 to receive and allow for the unobstructed movement of a crank 31, formed integral with the outer end of the shaft 28. This crank is operatively connected to the pitman 32, to which it gives a reciprocatory movement and drives the cutter-bar, to be referred to hereinafter.

Near the free end of the arm 13 of the casting 11 is secured a laterally-projecting brace-rod 33, which extends over to and is secured to a frame-bar 34, which is loosely secured to the axle 1 of the machine.

It will be noticed that the free end of the rod 33 projects through an eye 35 in the end of the bar 34 and terminates in a bearing 33ᵃ, on which is journaled a yoke-shaped casting 36, extending forwardly of the machine and operated to oscillate on the said bearing by means of a rod 37, projecting from the top of said yoke-shaped casting and connected to an operating-lever 38, located at a convenient point adjacent the rear of the machine and within easy reach of the operator from the seat 21. The frame 34 is provided with an upright 70, having an opening at its upper end which coacts by means of a pin or other suitable means with openings in the frame-bar 37, so as to adjust the yoke-shaped casting 36 as may be required.

A projecting upwardly-bearing lug (designated by the reference-numeral 40) is formed on the bar 34, and on the end of the bearing 33ᵃ is a washer 41 to retain the yoke-shaped casting 36 in place. A finger 42 projects laterally from the bearing 33ᵃ and passes through an eye 43 in the lug 40 to add strength to the machine.

The pole or draft appliance 44 is secured to the casting 11 in any convenient manner, and at a suitable point near the forward end thereof is arranged an adjustable bracket 45, fastened to said pole by a bar 46. The lower end of the bracket is bifurcated at 46×, and held between the bifurcated portions of said bracket is a whiffletree or other draft appliance 47. The rear end of the bracket is connected to the bar 48 by a connection 48'.

I provide the following parts, which coact with cutting mechanism for elevating the same: Projecting from the side of the pole is a shaft or journal 49, on which is pivoted a lever 50, the upper end of which is connected to the finger 42 by a connection 51, the object of which will be apparent hereinafter. To the lower end of the lever 50 is pivoted a dog 52, said dog in turn being pivoted to a crank-shaft 53, carried by the pole of the machine, and this dog is adapted to be engaged by a lever 54 on the shaft or journal 49 on one side of the pole. A foot-lever 55 is secured to the casting 11 at the other side of the pole and connected by a link to the crank-shaft 53. The cutting mechanism may be raised by depressing the lever 54, which operates the pawl 52, the lever 50, and link 51 to raise the finger 42. Pressure on the foot-lever 55 will also act through the pawl 52 to raise the lower end of the lever 50, and by correspondingly lowering the lever 54 it is held in contact with the pawl 52, thus holding the parts in their adjusted position. The lever 54 carries the usual sliding pawl 56 to engage a segmental rack 57, so as to hold the lever in its adjusted position. A coil-spring 58 is secured at its respective ends to the dog and pole, whereby accidental disengagement of the dog with its engaging lever is prevented.

The cutting mechanism, which I have designated by the reference-numeral 59, comprises the usual guard-fingers and finger-bar, shoes, swath-clearers, &c., which are common to the ordinary reciprocating cutting mechanism and is carried by and hinged to two projecting lugs 60 and 61, formed on the yoke-shaped casting above described.

A strengthening-bar 63 is pivoted to the free end of the arm 13 of the casting 11 and to the cutting mechanism 59 in order to provide additional strength, but without interfering with the elevating or lowering of said cutting mechanism.

In the event that the cutter-bar should strike a tree-stump or other obstruction the strain would occur on the bar 34, thus reducing the liability of the machine to become broken.

The means controlling the entire mechanism is within easy reach of the operator, and it will not be necessary for him to leave his seat to manipulate any of the levers.

I would also have it understood that various changes in the form, proportion, and the minor details of construction may be resorted to without departing from the principle or sacrificing any of the advantages of this invention.

Having thus fully described my invention, what I claim, and desire to secure by Letters Patent, is—

In a mower, the combination with an axle, and a pair of wheels thereon, of a casting loosely mounted on the axle and projecting forwardly, a gearing carried by the casting, a shaft journaled in the hollow arm and adapted to be driven by the gearing, a brace-rod pivoted to the axle and arranged longitudinally of the machine, an apertured lug on the said brace-rod, a brace pivoted to the hollow arm and to the first-named brace and provided with an arm projected through the apertured lug thereon, a yoke-shaped runner pivoted on the last-named brace and cutting mechanism carried by the runner, a pitman connected to the shaft and to the cutting mechanism, a brace pivoted to the end of the hollow arm and to the cutting mechanism to add rigidity to the machine, and levers connected to the yoke-shaped runner for lifting the cutting mechanism.

In testimony whereof I affix my signature in presence of two witnesses.

SAMEIL W. JOHNSON.

Witnesses:
JAMES CARTER,
LOUIE JOHNSON.